Figure 1:
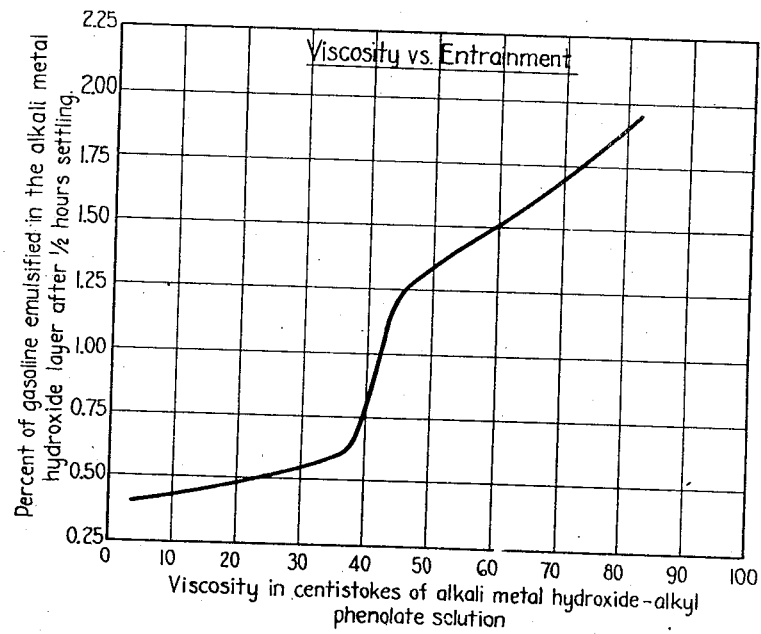

May 28, 1940.  D. L. YABROFF ET AL  2,202,039
PROCESS FOR THE REMOVAL OF MERCAPTANS FROM HYDROCARBON DISTILLATES
Filed June 25, 1938  2 Sheets-Sheet 1

Inventors:
David Louis Yabroff
Ellis R. White
By their Attorney

Patented May 28, 1940

2,202,039

UNITED STATES PATENT OFFICE 2,202,039

PROCESS FOR THE REMOVAL OF MERCAPTANS FROM HYDROCARBON DISTILLATES

David Louis Yabroff, Berkeley, and Ellis Ross White, Albany, Calif., assignors to Shell Development Company, San Francisco, Calif., a corporation of Delaware Application June 25, 1938, Serial No. 215,804

5 Claims. (Cl. 196—30)

This invention deals with the removal of mercaptans from hydrocarbon oils containing same by treatment with an aqueous solution of caustic alkali, and in particular is concerned with the use of aqueous solutions of alkali metal hydroxides containing substantial amounts of alkali metal alkyl phenolates for carrying out this treatment.

Petroleum distillates and in particular gasolines containing undesirable amounts of mercaptans have a sour reaction and unpleasant odor. It is difficult to remove the mercaptans from the distillates by extraction with caustic alkali, and therefore sweetening is usually accomplished by oxidation, whereby mercaptans are converted to disulfides. Disulfides, however, have the disadvantage of adversely affecting knock rating and susceptibility to tetraethyl lead, and it is therefore generally recognized that a practical sweetening method by which the mercaptans are actually removed rather than oxidized to disulfides would be far more preferable.

It has already been recognized that alcoholic solutions of alkali metal hydroxides are more efficient in the removal of mercaptans from hydrocarbon oils than aqueous caustic alkalis. However, the presence of alcohols makes difficult a regeneration of the spent alkali metal hydroxide containing mercaptides, and therefore no process employing alcoholic caustic alkali has achieved commercial importance as yet. Easier regenerability of the caustic alkali solution is an essential prerequisite for its practical application.

It has further been suggested to improve the extraction efficiency of caustic alkali for mercaptans by adding phenolic compounds such as alkyl phenols to a water solution of caustic alkali. However, considerable difficulties arose in the application of the resulting solutions, the chief objection being slow and incomplete separation of the aqueous solution and hydrocarbon oil, which resulted in substantial losses of entrained hydrocarbon oil to the phenolate solution. The addition of alcohol to the phenolate-hydrocarbon mixture tends to cure this difficulty, but makes regeneration of the spent aqueous solution very difficult and expensive.

It is a purpose of this invention to extract mercaptans contained in hydrocarbon oils efficiently by means of aqueous solutions of alkali metal hydroxides containing substantial amounts of dissolved alkyl phenolates only, under conditions to avoid operating difficulties and to produce spent aqueous alkaline solutions containing mercaptides, which spent solutions can be regenerated easily by simple steaming without loss of any essential component of the solution. It is another purpose to so limit the alkyl phenolate content of the aqueous solution to enable extracting the mercaptans without undue loss of hydrocarbon oils and in the absence of auxiliary solvents such as alcohols.

Now we have discovered that by employing for the extraction of mercaptans aqueous solutions of alkali metal hydroxides containing alkali metal alkyl phenolates in certain limited amounts, the beneficial effects of alkali metal phenolates on the extraction of mercaptans can be had as well as ready and complete separation of the aqueous solution from the hydrocarbon oil, together with easy regenerability of the spent solution by simple steaming. We have found that the separation without substantial entrainment is largely a function of the viscosity of the aqueous solution. If the viscosities of aqueous alkali metal phenolate solutions are plotted against the amount of hydrocarbon liquid entrained in the aqueous solution upon allowing mixtures of said solutions and hydrocarbon oils to settle, it is found that the amount entrained gradually increases with increasing viscosities up to about $37\frac{1}{2}$ centistokes. At this point, a sudden, sharp upturn of the curve occurs, the increments in entrainment being far greater for a given viscosity increment above this point. This phenomenon, for which at present we have no explanation, is illustrated by the curve in Figure 1, in which the rate of settling is plotted against the viscosity of the aqueous phase at the temperature of settling, settling rates being expressed in terms of the amount of gasoline distillate retained in the aqueous phase after one-half hour of settling. The mixtures which were allowed to settle were obtained by agitating 1 volume of aqueous sodium hydroxide-sodium alkyl phenolate solutions of various viscosities with 1 volume of a full range cracked gasoline under a standardized set of conditions.

Normally the extraction of mercaptans is carried out at about room temperature, although higher and lower temperatures may be used within reasonable limits. At temperatures substantially below normal room temperatures, however, the viscosity limitations of the aqueous solution necessitate the use of relatively weak caustic alkali-phenolate solutions having low viscosities and low extraction powers for mercaptans, and with rising temperatures the extraction efficiencies for mercaptans diminish rapidly, so that above certain temperatures the advantages gained by the addition of the phenolates to the alkali metal hydroxide solution may be completely negated. For these reasons, extraction temperatures should be between the limits of about 32° to 140° F. and preferably between about 60° to 100° F.

In order exactly to determine the composition of the alkaline alkyl phenolate solutions which may be used in the extraction without causing settling difficulties, we have investigated the relation of composition, viscosity and extraction power for mercaptans of the various phenolate solutions. The following important facts have been established:

On the basis of grams of alkyl phenolate radicals per liter of solution, different alkyl phenol fractions boiling below about 450 F. are equivalent in the matter of enhancing the extraction power of the caustic alkali for mercaptans, as well as increasing its viscosity. Phenol, i. e., hydroxy benzene, in contrast to alkyl phenols is, however, decidedly inferior, resulting in alkaline phenolate solutions of much lower extracting powers on the basis of both equal weight of phenolate radicals in the solution and equal viscosity of the resulting solution. For example, when treating two samples of a West Texas gasoline each with 20% of an aqueous solution containing 4 mols per liter free NaOH and in addition 150 grams of alkyl phenolate and phenolate radicals, respectively, per liter, the percentages of mercaptans extracted were 26 and 17%, respectively. Therefore, we use alkyl phenolates in preference to phenolate, although alkyl phenolate mixtures containing substantial but less than predominating amounts of phenolate may be used.

The relation of contents of free NaOH and sodium alkyl phenolate for solutions having a viscosity at 100° F. of 37½ centistokes may be expressed by the following approximate equation:

$$A = 525 - 41 \times B$$

where A represents the amount of alkyl phenolate radicals in grams per liter of solution, and B is the normality of the free NaOH.

Figure 2:
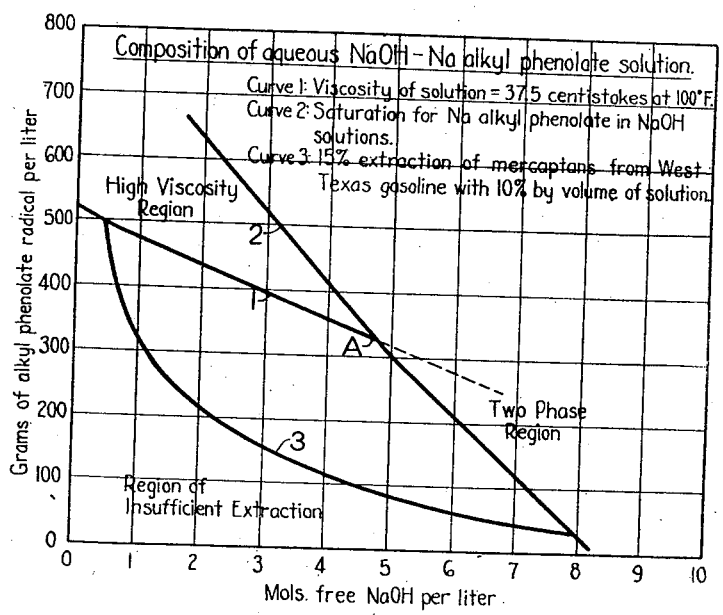

This equation is graphically presented as curve I in Figure 2. As will be noted, curve I is intersected at point A by another curve 2 which represents the solubility limits of alkyl phenolates in NaOH solutions of different mol concentrations. Curve 2 divides the area between the coordinates into two portions. The portion to the left of this curve represents solutions forming a single liquid phase, and the area to the immediate right of curve 2 represents a two phase region.

Figure 2 contains still another curve 3 which represents the composition of a series of solutions possessing extraction powers for mercaptans just above the maximum extraction powers of straight aqueous solutions of alkali metal hydroxide free from solutizers or solubility promoters for mercaptans. For example, when treating a certain typical West Texas sour gasoline with 10% by volume of aqueous solutions containing alkali metal hydroxide only, the best extraction obtainable in a single stage is of the order of about 12% or below. Under the same conditions, any of the solutions represented by curve 3 would extract from the same gasoline 15% of the mercaptans. Curve 3 may be represented by the approximate equation:

$$A = \frac{1160}{B+1.85} - 83$$

where A represents the amount of alkyl phenolate radicals in grams per liter of solution, and B is the normality of the free NaOH.

The area between curves 1, 2 and 3 represents the compositions of the solutions which have extraction powers for mercaptans materially superior to those of the best straight aqueous solutions of alkali metal hydroxide, possess viscosities below the critical viscosity limit of 37½ centistokes and form but a single phase. If efficient economical extraction of mercaptans is desired with solutions consisting of alkali metal hydroxide, alkali metal alkyl phenolate and water under conditions to avoid undue losses by entrainment, it is necessary to choose a solution, the composition of which is within the enclosed area.

Figure 3:
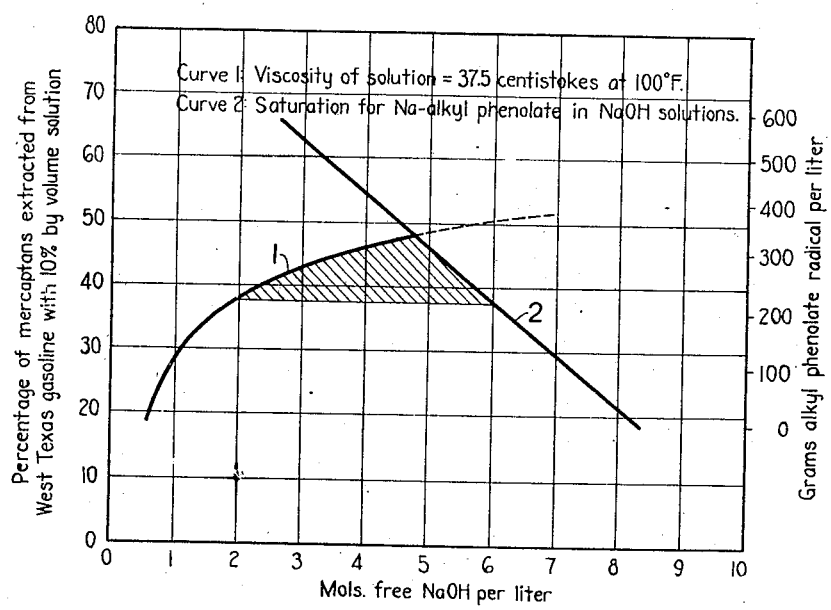

A further desirable though not essential limitation is to maintain the normality of the free alkali metal hydroxide in the alkyl phenolate solution between the approximate limits of 2 to 6. The reasons for this become evident from an examination of Figure 3 in which the maximum percentages of mercaptans extractable by treating a West Texas gasoline at 100° F, with 10% by volume of caustic soda-alkyl phenolate solutions are plotted against free NaOH content of the solution. As shown before, the two properties which limit the useful composition, and as a result thereof, the extraction power of the solution, are viscosity and maximum solubility of the alkyl phenolate in the aqueous alkali metal hydroxide solution. In Figure 3, the percentages of mercaptans extracted from a West Texas gasoline by treating same with 10% by volume of the aqueous solution having these limiting properties are plotted against the normality of the free caustic soda. Curve 1 represents the percent mercaptans extracted with solutions having viscosities of 100° F. of 37.5 centistokes, and curve 2 the percent mercaptans extracted with solutions which are saturated with sodium alkyl phenolates. The scale on the right-hand ordinate indicating the grams of alkyl phenolates contained in a saturated solution refers to curve 2 only. It will be seen that an optimum extracton may be achieved when the normality of the free NaOH is maintained between the limits of about 2 to 6 normal as indicated by the shaded area, and preferably 4 to 5 normal, the removal of mercaptans being greatest in this range.

While in the foregoing we have specifically referred to aqueous solutions of sodium hydroxide-sodium alkyl phenolates, and have disclosed the relations existing between the compositions of these solutions and the limitations which must be observed to enable the extraction of mercaptans to proceed efficiently, we have found that the corresponding relations for other alkali metals such as potassium are very similar and may be expressed in the manner shown to exist for sodium.

The amounts of alkali metal hydroxide-alkyl phenolate solution employed for separating mercaptans from hydrocarbon oils normally varies between about 5 to 100 volume per cent, although smaller or larger quantities may be employed, if desired.

It is further understood that countercurrent extraction methods may be employed in which the hydrocarbon oil and the aqueous alkaline alkyl phenolate solution are passed in opposite directions either through a tower or through a series of mixers and settlers.

Regeneration of the spent alkaline alkyl phenolate solutions containing mercaptans may be accomplished by steaming in accordance with the principals disclosed in our co-pending application Serial No. 174,512, filed November 15, 1937.

The expression "alkyl phenol" as herein used refers to mixtures of alkylated hydroxy benzenes such as may be obtained by extraction of coal tar oils or cracked petroleum-distillates with aqueous caustic alkali solution, and acidification of the extract. As is known mixtures of these alkyl phenols consist predominantly of monohydroxy benzene and alkyl mono hydroxy benzenes.

We claim as our invention:

1. In the process or refining sour hydrocarbon oils containing mercaptans by extracting with aqueous solutions of alkali metal hydroxides, to produce hydrocarbon oils of low mercaptan and di-sulfide content, the improvement comprising extracting a sour hydrocarbon oil free from preformed di-sulfides and containing mercaptans at a temperature between 32° and 140° F. with a solution which consists essentially of free alkali metal hydroxide, alkali metal alkyl phenolate and water, which has a viscosity at the extraction temperature of less than 37½ centistokes and contains an amount of alkyl phenolate radicals below their saturation concentration and at least equal to $$\frac{1160}{\text{mols free alkali metal hydroxide}+1.85} - 83 \text{ grams per liter}$$

under conditions to absorb at least a portion of said mercaptans and to form two liquid layers, a lower aqueous layer containing absorbed mercaptans in the form of mercaptides, and an upper layer of treated hydrocarbon oil, and separating the layers.

2. The process of claim 1 in which the temperature is between normal room temperature and 100° F.

3. The process of claim 1 in which the alkyl phenolate comprises less than a predominating amount of phenolate.

4. In the process of refining sour hydrocarbon oils containing mercaptans by extracting with aqueous solutions of alkali metal hydroxides to produce hydrocarbon oils of low mercaptans and di-sulfide content, the improvement comprising extracting a sour hydrocarbon oil free from preformed di-sulfides and containing mercaptans at a temperature between 32° and 140° F. with a solution which consists essentially of free sodium hydroxide, sodium alkyl phenolate and water, which has a viscosity at the treating temperature of less than 37½ centistokes and contains an amount of alkyl phenolate radicals less than saturation and at least equal to $$\frac{1160}{\text{mols free NaOH}+1.85} - 83 \text{ gms. per liter}$$

and from 2 to 6 mols free sodium hydroxide per liter, under conditions to absorb at least a portion of said mercaptans and to form two liquid layers, a lower aqueous layer containing absorbed mercaptans in the form of mercaptides, and an upper layer of treated hydrocarbon oil, and separating the layers.

5. In the process of refining sour hydrocarbon oils containing mercaptans by extracting with aqueous solutions of alkali metal hydroxides to produce hydrocarbon oils of low mercaptan and di-sulfide content the improvement comprising extracting a sour hydrocarbon oil free from preformed di-sulfides and containing mercaptans at a temperature between normal room temperature and 100° F. with a solution which consists essentially of free sodium hydroxide, sodium alkyl phenolate and water and which contains from 2 to 6 mols free NaOH per liter and an amount of phenolate radicals less than saturation, less than 525–41 times normality of free NaOH and at least $$\frac{1160}{\text{mols free NaOH}+1.85} - 83 \text{ gms. per liter}$$

under conditions to absorb at least a portion of said mercaptans and to form two liquid layers, a lower aqueous layer containing absorbed mercaptans in the form of mercaptides, and an upper layer of treated hydrocarbon oil, and separating the layers.

DAVID LOUIS YABROFF.
ELLIS ROSS WHITE.